US011631004B2

(12) United States Patent
Kruglov

(10) Patent No.: US 11,631,004 B2
(45) Date of Patent: Apr. 18, 2023

(54) CHANNEL PRUNING OF A CONVOLUTIONAL NETWORK BASED ON GRADIENT DESCENT OPTIMIZATION

(71) Applicant: Intel Corporation, Santa Clara, CA (US)

(72) Inventor: Alexey Kruglov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 16/957,057

(22) PCT Filed: Mar. 28, 2018

(86) PCT No.: PCT/RU2018/000198
§ 371 (c)(1),
(2) Date: Jun. 22, 2020

(87) PCT Pub. No.: WO2019/190340
PCT Pub. Date: Oct. 3, 2019

(65) Prior Publication Data
US 2020/0394520 A1    Dec. 17, 2020

(51) Int. Cl.
*G06N 3/08* (2006.01)
*G06N 3/063* (2006.01)
(Continued)

(52) U.S. Cl.
CPC ............. *G06N 3/082* (2013.01); *G06N 3/063* (2013.01); *G06N 3/084* (2013.01)

(58) Field of Classification Search
CPC ........ G06N 3/082; G06N 3/063; G06N 3/084; G06N 3/0454
See application file for complete search history.

(56) References Cited

U.S. PATENT DOCUMENTS 9,978,177 B2 * 5/2018 Mehr ...................... G06T 7/149
2013/0273968 A1 * 10/2013 Rhoads ............... H04M 1/0264
455/566

(Continued)

OTHER PUBLICATIONS

Pavlo Molchanov et al: "Pruning Convolutional Neural Networks for Resource Efficient Inference", Jun. 8, 2017 (Jun. 8, 2017), pp. 1-17, (Year: 2017).*

(Continued)

*Primary Examiner* — Michael N Opsasnick
(74) *Attorney, Agent, or Firm* — Essential Patents Group, LLP.

(57) ABSTRACT

Techniques and mechanisms for determining the pruning of one or more channels from a convolutional neural network (CNN) based on a gradient descent analysis of a performance loss. In an embodiment, a mask layer selectively masks one or more channels which communicate data between layers of the CNN. The CNN provides an output, and calculations are performed to determine a relationship between the masking and a loss of the CNN. The various masking of different channels is based on respective random variables and on probability values each corresponding to a different respective channel In another embodiment, the masking is further based on a continuous mask function which approximates a binary step function.

18 Claims, 7 Drawing Sheets

(51) Int. Cl.
*G06N 3/082* (2023.01)
*G06N 3/084* (2023.01)

(56) References Cited

U.S. PATENT DOCUMENTS

| | | | | |
|---|---|---|---|---|
| 2014/0201126 A1* | 7/2014 | Zadeh | ............... | A61B 5/165 706/52 |
| 2018/0114114 A1* | 4/2018 | Molchanov | ............ | G06N 3/084 |
| 2018/0204111 A1* | 7/2018 | Zadeh | ................ | G06N 3/0436 |
| 2019/0188567 A1* | 6/2019 | Yao | ..................... | G06N 3/04 |

OTHER PUBLICATIONS

Sajid Anwar et al: "Structured Pruning of Deep Convolutional Neural Networks", ACM Journal on Emerging Technologies in Computing Systems (JETC), ACM, 2 Penn Plaza, Suite 701 New York NY 10121-0701 USA, vol. 13, No. 3, Feb. 9, 2017 (Feb. 9, 2017), pp. 1-18 (Year: 2017).*
He Yihui et al: "Channel Pruning for Accelerating Very Deep Neural Networks", 2017 IEEE International Conference on Computer Vision (ICCV), IEEE, Oct. 22, 2017 (Oct. 22, 2017), pp. 1398-1406, (Year: 2017).*
International Search Report and Written Opinion from PCT/RU2018/000198 notified Dec. 19, 2018, 12 pgs.
Anwar, Sajid et al., "Structured Pruning of Deep Convolutional Neural Networks", ACM Journal on Emerging technologies in Computing Systems (JETC), vol. 13, No. 3, Feb. 2017, 11 pgs.
Guo, Yiwen et al., "Dynamic Network Surgery for Efficient DNNs", <https://arxiv.org/abs/1608.04493> Nov. 10, 2016, 9 pgs.
Han, Song et al., "Learning both Weights and Connections for Efficient Neural Networks", <https://arxiv.org/abs/1506.02626>, 2015, 9 pgs.
He, Yihui et al., "Channel Pruning for Accelerating Very Deep Neural Networks", IEEE International Conference on Computer Vision (ICCV), Oct. 2017, 10 pgs.
Jefkine, "Backpropagation in Convolutional Neural Networks", DeepGrid, Sep. 5, 2016, 12 pgs.
Molchanov, Pavlo et al., "Pruning Convolutional Neural Networks for Resource Efficient Inference", <https://arxiv.org/abs/1611.06440> Jun. 8, 2017, 17 pgs.
Polyak, Adam et al., "Channel-Level Acceleration of Deep Face Representations", IEEE Access, vol. 3, 2015, pp. 2163-2175.
Sharma, Aditya et al., "The Incredible Shrinking Neural Network: New Perspectives on Learning Representations through the Lens of Pruning", <https://arxiv.org/abs/1701.04465> 2017, 16 pgs.
Srinivas, Suraj et al., "Data-free Parameter Pruning for Deep Neural Networks", <https://arxiv.org/abs/1507.06149>, 2015, 12 pgs.
Wang, Huan et al., "Structured Probabilistic Pruning for Convolutional Neural Network Acceleration", <https://arxiv.org/pdf/1709.06994.pdf> 2018, 13 pgs.
Wang, Zhengtao et al., "Towards Thinner Convolutional Neural Networks Through Gradually Global Pruning", <https://arxiv.org/abs/1703.09916> 2017, 5 pgs.
Yang, Tien-Ju et al., "Designing Energy-Efficient Convolutional Neural Networks using Energy-Aware Pruning", <https://arxiv.org/abs/1611.05128> 2016, 9 pgs.

* cited by examiner

CHANNEL PRUNING OF A CONVOLUTIONAL NETWORK BASED ON GRADIENT DESCENT OPTIMIZATION

CLAIM OF PRIORITY

This Application is a National Stage Entry of, and claims priority to, PCT Application No. PCT/RU2018/000198, filed on Mar. 28, 2018 and titled "CHANNEL PRUNING OF A CONVOLUTIONAL NETWORK BASED ON GRADIENT DESCENT OPTIMIZATION," which is incorporated by reference in its entirety for all purposes.

BACKGROUND

Embodiments described herein generally relate to convolutional neural networks, and more particularly, but not exclusively, relate to technologies for determining the pruning of a channel from a convolutional neural network.

BACKGROUND ART

Neural network compression generally refers to techniques which provide or otherwise identify a relatively small neural network to be used as an alternative to some larger neural network. The goal of such compression is to enable lower resource utilization without significantly sacrificing network functionality.

Compression by neural network pruning is technique which removes neurons, synapses and/or other hardware of the network. Often, such pruning is performed in combination with network fine-tuning and repeated several times. Pruning tends to increase the time needed to train the neural network design. However, such training is typically done only once, and an overall computational efficiency is achieved due to the resulting compressed network being implemented many times over on a large number of devices.

Pruning can reduce the amount of memory required to store neural network parameters and can reduce processing hardware of the network which would otherwise be needed. One example advantage of such pruning is lower computational requirements to interface a neural network with external circuitry. This can be important for applications where a neural network is implemented in any of various embedded architectures.

Successive generations of neural network technologies continue to increase in variety and capability. Moreover, an ever-increasing number and variety of devices are capable of implementing neural network technologies. As a result, there is expected to be an increasing premium placed on incremental improvements to efficient implementation of neural networks.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
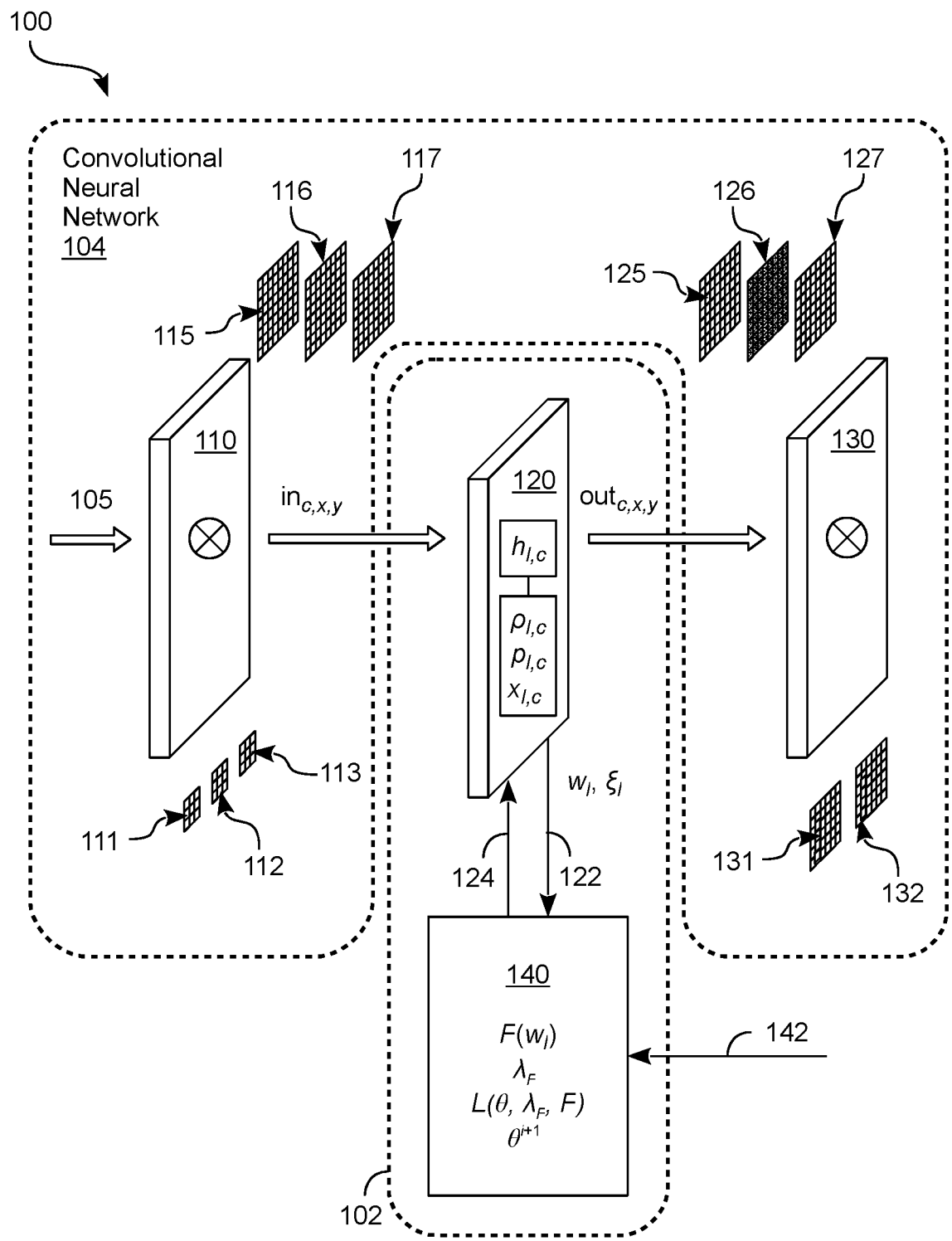
FIG. 1 is a functional block diagram illustrating elements of system to determine a pruned convolutional neural network according to an embodiment.

Embodiments described herein variously provide techniques and mechanisms to enable pruning of a convolutional neural network (CNN), where such pruning reduces an amount of a processing resource—e.g., including a number of floating point operations (or "FLOPs")—which is to be used in operation of the pruned CNN.

To illustrate certain features of various embodiments, network pruning is described herein with reference to one or more channels being identified for pruning based on the evaluation of a number of FLOPs which the CNN, as pruned, would be expected to perform. Such pruning is further described with reference to an evaluation of a loss which would be based on such pruning. However, in various embodiments, one or more other processing resources (other than FLOPs) may be additionally or alternatively evaluated for use in identifying a CNN channel to be pruned.

As used herein, "loss" refers to a metric of performance by a CNN—e.g., where the metric indicates or otherwise corresponds to a difference between a network output for a given iteration and a ground truth data set which is the basis for, or which otherwise corresponds to, said network output. Such loss may be a function of CNN parameters which are to be minimized or otherwise reduced by an optimization process during network training. Accordingly, "loss" and "loss function" are used interchangeably herein. Network loss may approach a minimal value as CNN training results in network outputs becoming sequentially closer to ground truth data. In some embodiments, a loss function provides a single scalar value for each minibatch of a given iteration. Alternatively or in addition, a loss may be evaluated as a summation (or other function) of some multiple constituent network loss terms.

A process to determine the pruning of a CNN (for brevity, referred to herein as an "evaluation process") may include selectively "masking" one or more channels. In the context of a given channel, "mask," "masked," "masking," and related terms refers to the replacement of data values in that channel each with a respective zero or some otherwise attenuated representation of said data value. For a given iteration of an evaluation process, at least some channels may be variously masked each between a respective two layers of the CNN—e.g., where such channels include two or more channels arranged in sequence with each other. By masking at different channels along such a sequence, the evaluation process may concurrently evaluate pruning of the CNN as a whole—e.g., as opposed to sequentially evaluating pruning one layer at a time.

In some embodiments, masking of a given channel is based on a respective probability value, a respective random number and a continuous (e.g., Lipschitz-continuous) mask function. A Lipschitz-continuous mask function may approximate a unit step function which, for example, is scaled along one dimension and/or shifted along another dimension. Such a function may facilitate the determination of one or more differentials each of a loss function L and/or a resource amount F with respect to one or more channel masking parameters. In turn, the one or more differentials may be used in gradient descent analysis and optimization.

The probability value for a given channel, and the corresponding masking of that channel, may be updated for a given iteration based on a network loss and/or an amount of a processing resource (e.g., a number of FLOPS) detected for the preceding iteration. Iterations of the evaluation process may enable the identification of one or more channels to be pruned each on a whole-channel basis—e.g., where pruning of a given channel includes pruning one or more connections which communicate data of the channel and/or pruning one or more neurons, weights and/or other components which generate such data. Alternatively or in addition, an iteration may automatically tune one or more "hyperparameters" which determine, at least in part, the modification of some one or more other parameters.

The technologies described herein may be implemented in one or more electronic devices. Non-limiting examples of electronic devices that may utilize the technologies described herein include any kind of mobile device and/or stationary device, such as computer terminals, desktop computers, laptop computers, netbook computers, notebook computers, internet devices, servers (e.g., blade server, rack mount server, combinations thereof, etc.), combinations thereof, and the like. More generally, the technologies described herein may be employed in any of a variety of electronic devices including circuitry to evaluate the pruning of a convolutional neural network.

FIG. 1 shows features of a system 100 to determine the pruning of a convolutional neural network (CNN) according to an embodiment. System 100 is one example of an embodiment wherein logic (e.g., including hardware and/or executing software) facilitates the identification of one or more channels of a CNN for pruning based on a gradient descent evaluation. The gradient descent evaluation may be based on network performance information which corresponds to the configuration of one or more "mask layers" each coupled between a respective two layers of the CNN. Such configuration may determine whether and/or how the one or more mask layers are to variously mask communications via respective data channels.

As shown in FIG. 1, system 100 may include a device 102 comprising one or more mask layers (e.g., including the illustrative mask layer 120) which are each to couple between a respective two layers of a CNN 104. As used herein, "mask layer" refers to logic (e.g., including hardware, firmware, executing software and/or the like) which is operable to intercept data being communicated via multiple channels between two layers of a CNN, and to variously provide at least partial masking of said data, where the masking varies on a per-channel basis.

By way of illustration and not limitation, mask layer 120 may be coupled between layers 110, 130 of CNN 104 (which is included in, or is to couple to, system 100). In the example embodiment shown, layers 110, 130 are each convolutional layers of CNN 104. However, either of layers 110, 130 may belong to any of a variety of other CNN layer types, where the layer is to function as a source of data received via some plurality of channels and/or to function as a sink for data output via some other plurality of channels. For example, layer 110 or layer 130 may be one of an input layer, a pooling layer, a fully connected layer or the like, in other embodiments. The particular structure and operation of layers 110, 130 may be adapted from existing convolutional neural network techniques, which are not detailed herein to avoid obscuring certain features of various embodiments.

At a given time, a configuration of a mask layer (referred to herein as a "mask configuration") may determine how that mask layer is to variously mask different channels. At different times during an evaluation process, such a mask layer may be variously provided with other mask configurations to enable additional and/or alternative masking of said channels. For example, logic of mask layer 120 may be (re)configured to selectively mask or forego masking—data being communicated between layers 110, 130 via respective channels. Mask layer 120 may calculate parameters corresponding to this masking—e.g., where some or all of the parameters are provided to other logic of device 102 (via signals 122 which are sent to the illustrative evaluation logic 140 shown).

Evaluation logic 140 of device 102 may operate to identify loss information, processing resource information and/or other data related to the respective mask configurations of one or more mask layers including mask layer 120. For example, evaluation logic 140 may receive both signals 122 and other signals 142 which is based on an output from CNN 104. Signals 142 may specify or otherwise indicate whether masking with mask layer 120 (and, in some embodiments, one or more other mask layers of device 102) corresponds to a network loss of CNN 104. Based on signals 122, 142, evaluation logic 140 may identify corresponding loss information, processing resource information, etc., some or all of which may be provided to the one or more mask layers (e.g., with signals 124). Based on signals 124, mask layer 120 may determine how (if at all) masking by mask layer 120 may have contributed to a network loss which is indicated by signals 142. Alternatively or in addition, a reconfiguration of mask layer 120 based on signals 124 may prepare for a next iteration of the evaluation process.

Operations to identify a pruning of CNN 104 may include determining initial values for various parameters—e.g., including parameters of CNN 104 itself, parameters which are specific to a mask layer 120 and/or one or more parameters which are generic with respect to multiple mask layers. An index l is used herein to indicate a particular mask layer, where the index c indicates a particular channel at that mask layer, and the index i indicates a particular iteration of an evaluation process to determine network pruning. To avoid obscuring some features of various embodiments, the identification of some parameters herein may omit the use of one or more indices.

In an embodiment, an initialization state of device 102 may include initial values of parameters $\rho_{l,c}^i$ which are to be used to determine corresponding retention probabilities $p_{l,c}^i$ (e.g., where any particular $\rho_{l,c}^i$ or $p_{l,c}^i$ is specific to a particular mask layer, specific to a particular channel of that mask layer, and specific to a particular iteration). The retention probability $\rho_{l,c}^i$ for a given channel may represent or otherwise indicate a probability that, at least during iteration i, the channel in question will be retained—i.e., protected from masking which might otherwise set data of the channel to 0. Values of $\rho_{l,c}^i$ may be initially set to some maximum allowed value $\rho_{lim}$ which, for example, is defined by a user based on characteristics of CNN 104 and/or other implementation-specific details. Alternatively, one or more initial values of $\rho_{l,c}^i$, may be based on values determined during pre-training and/or training of CNN 104.

Alternatively or in addition, the initialization state of device 102 may include initial values of parameters $D_{l,c}^i$ which are used to determine parameters $\rho_{l,c}^{i+1}$ that, in an (i+1)th iteration of the evaluation process, are to serve as an updated version of parameters $\rho_{l,c}^i$. As described elsewhere herein, a given parameter $D_{l,c}^i$ may be based on, or otherwise vary with, a derivative of a loss function which is associated with a configuration of CNN 104 (where the configuration corresponds to a proposed pruning of CNN 104). For example, the given parameter $D_{l,c}^i$ may be equal to or otherwise indicate an average variance of such a derivative (e.g., where the average is an exponential moving average over multiple iterations). In some embodiments, $D_{l,c}^i$ indicates a mean square of a loss function derivative. Initially, values of parameters $D_{l,c}^i$ may be set to 0 or, alternatively, set to respective values obtained from a snapshot of CNN 104 during pre-training or training thereof. Subsequently, iteratively updated values of $D_{l,c}^i$ may be obtained using calculations that, for example, are adapted from conventional RMSprop solver techniques.

The initialization state of device 102 may further include an initial value of a Lagrange multiplier $\lambda_F^i$ which is to be applied to a parameter $F^i$ which represents or otherwise indicates an amount of some processing resource of CNN 104—e.g., where the processing resource includes FLOPs. To facilitate gradient descent evaluation of CNN 104, Lagrange multiplier $\lambda_F^i$ may be iteratively updated based on parameter $F^i$ and/or may be used to iteratively update parameter $F^i$. In some embodiments, an initial value of $\lambda_F^i$ may be set to zero ("0") or, alternatively, to a value obtained from a snapshot of CNN 104 during pre-training or training thereof.

The initialization state of device 102 may further include a determined set of variables $\theta = \{\theta_k^i\}$ which represent parameters of CNN 104, some or all of which are candidates for pruning. Examples of such parameters include weights and, optionally, biases of convolutional layers and/or fully connected layers. By contrast, a non-learnable parameter of CNN 104 may include, for example, a kernel size for a given convolution. Prior to any processing to determine channel pruning, CNN 104 may be trained to process data. Such training may be adapted from conventional neural network training techniques, which are not detailed herein and are not limiting on some embodiments. Training of CNN 104 may determine initial values for learnable parameters $\theta^i$ (where "initial," in this context, is with respect to the subsequent processing for determining a pruning of CNN 104).

After device 102 is initialized, an evaluation process may be performed—e.g., where one or more iterations of the evaluation process each include a "forward pass" portion and a subsequent "backward pass" portion. During a forward pass, test data may be communicated with layers of CNN 104, where one or more mask layers (e.g., including mask layer 120) are coupled each to intercept, and selectively mask, at least in part, some respective data which is based on the test data. A loss of CNN 104 may result from such masking, wherein the backward pass of the iteration communicates or otherwise determines a relationship between such loss and one or more parameters of system 100. During or after the backward pass, some or all such parameters may be variously updated to determine a possible pruning of CNN 104 and/or to prepare for a next iteration of the evaluation process.

In preparation for a given iteration i, some embodiments determine, for each $\rho_{l,c}^i$, a corresponding probability $p_{l,c}^i$ that an associated channel is to be "maintained"—i.e., protected from masking for at least the iteration i. It is noted that $(1-p_{l,c}^i)$ may, accordingly, represent a probability of such a channel being pruned (or "dropped"). In one example embodiment, $p_{l,c}^i$ has a sigmoid relationship a to $\rho_{l,c}^i$—e.g., according to the following:

$$p_{l,c} = \sigma(\rho_{l,c}) = \frac{1}{1+\exp(-\rho_{l,c})} \quad (1)$$

The forward pass may further use random values $x_{l,c}^{i,n}$ (where the index n in this context indicates a corresponding sample inside a minibatch). Possible values for random values $x_{l,c}^{i,n}$ may include non-binary values between 0 and 1—e.g., wherein such values are independent samples from a continuous uniform distribution in the range [0,1]. Some or all parameters $x_{l,c}^{i,n}$ may be variously set to new, random values in each iteration of the evaluation process.

A given mask configuration of mask layer 120 may enable the application of mask values $h_{l,c}^{i,n}$ each to a different respective channel, the mask values $h_{l,c}^{i,n}$ variously determined each based on a respective probability $\rho_{l,c}^i$ and a respective random value $x_{l,c}^{i,n}$. Some embodiments enable at least some adaptive (or "learnable") mask layer functionality by using an approximation of a strictly binary step function to determine a mask value—e.g., wherein the approximation is a continuous (e.g., Lipschitz-continuous) mask function. By way of illustration and not limitation, mask values $h_{l,c}^{i,n}$ may be determined according to the following:

$$h_{l,c}^{i,n} = s(x_{l,c}^{i,n}, (1-\in\kappa)\sigma(\rho_{l,c}^i-\in), \in\kappa+(1-\in\kappa)\sigma(\rho_{l,c}^i+\in)) \quad (2)$$

where $$s(x_{l,c}^{i,n}, x_0, x_1) = \begin{cases} 0 & \text{for } x_{l,c}^{i,n} \le x_0, \\ \frac{x_{l,c}^{i,n} - x_0}{x_1 - x_0} & \text{for } x_0 < x_{l,c}^{i,n} < x_1, \\ 1 & \text{for } x_{l,c}^{i,n} \ge x_1. \end{cases} \quad (3)$$

where $\sigma(\cdot)$ is a sigmoid function, and where $x_0$ and $x_1$ are lower and upper boundary values (respectively) for $x_{l,c}^{i,n}$. Constant parameters $\in$ and $\kappa$ may variously enable distortion of the function s, which varies continuously between 0 and 1. For example, the term $(1-\in\kappa)$ may scale a range [0,1] of possible values for the s function, where effective boundary values, corresponding to $x_0$ and $x_1$, are variously shifted based on the terms $\in\kappa$, $-\in$ and $+\in$.

The distribution of values $x_{l,c}^{i,n}$ may facilitate a distribution of mask values $h_{l,c}^{i,n}$ which is independent of various parameters of CNN 104. Furthermore, the continuous behavior of a mask function such as $s(x_{l,c}^{i,n}, x_0, x_1)$ may enable differentiation of one or more parameters of CNN 104 with respect to values $x_{l,c}^{i,n}$, thereby enabling the application of various gradient descent optimization techniques such as stochastic gradient descent (or "SGD").

Respective values of constants $\in$ and $\Lambda$ may be set so that a probability of fractional masking for any given channel is in a desired range. For example, $\in$ may be set to 0.25 and $\kappa$ to 0.04 in a training phase—e.g., where $\in$ is $10^{-10}$ in a testing phase. In such an embodiment, the probability of such fractional masking may be $\in\kappa=1\%$ in instances where $\rho$ is relatively far from zero, which corresponds to a nearly binary probability value $p=\sigma(\rho)\approx0$ or $p=\sigma(\rho)\approx1$. By contrast, the probability of such fractional masking may be approximately $\in/2$ (or 12.5%) in instances where $\rho\approx0$.

However, such values of ∈ and κ are merely illustrative, and may vary in different embodiments according to implementation-specific details.

Figure 2:
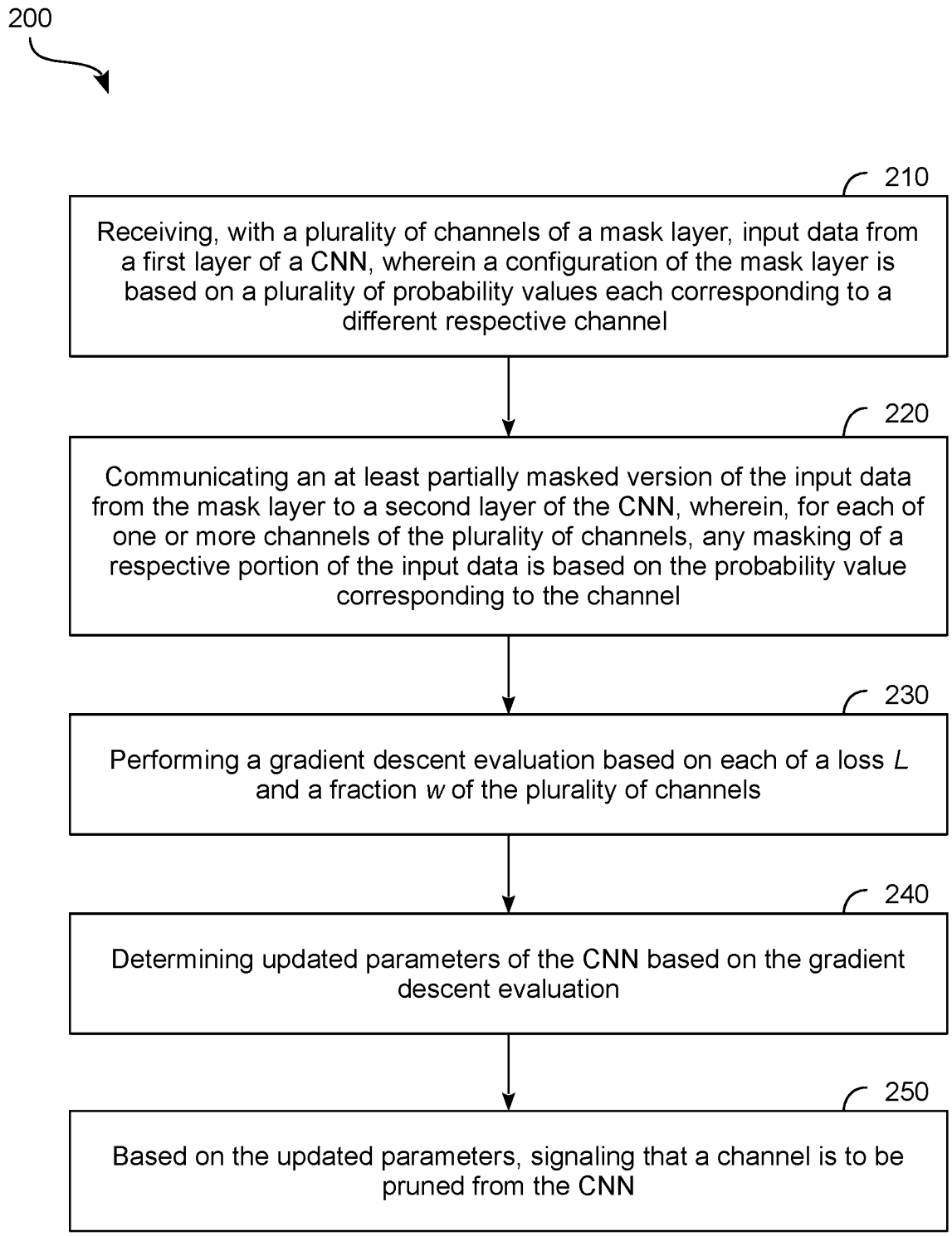
FIG. 2 is a flow diagram illustrating elements of a method to identify one or more channels to be pruned from a convolutional neural network according to an embodiment.

FIG. 2 shows features of a method 200 to determine a pruning of a CNN according to an embodiment. Method 200 is one example of an embodiment wherein one or more channels of a CNN are identified for pruning based on the evaluation of a gradient descent of a loss function for the CNN (the gradient descent with respect to parameters of the CNN). Some or all of method 200 may be performed by device 102, for example. However, method 200 may alternatively be performed by any of a variety of other system which, as described herein, comprise one or more mask layers and evaluation logic coupled thereto.

As shown in FIG. 2, method 200 may include (at 210) receiving, with a plurality of channels of a mask layer, input data from a first layer of a CNN. A configuration of the mask layer may be based on a plurality of values which each correspond to a different respective channel of the plurality of channels. The plurality of values may each indicate a respective probability that the corresponding channel is to be maintained.

For example, the receiving at 210 may include mask layer 120 receiving data (such as illustrative input data $in_{c,x,y}$ shown) which is generated by an earlier processing of data 105 by layer 110. In the particular context of data communicated to or from a given mask layer, indices x and y are used to indicated at least two other dimensions of the data (i.e., dimensions other than any channel c). In the example embodiment shown, layer 110 is a convolution layer which is to perform variously convolution operations each based on data 105 and further based on a different respective filter (e.g., one of the illustrative filters 111, 112, 113 shown). In a typical CNN, a convolutional layer with u input channels and v output channels (where u and v are respective integers) has u·v convolutional kernels, one kernel for each input channel/output channel combination. A data value provided from such a layer via a given output channel may be based on respective contributions from each of the input channels—e.g., where each such contribution is based on a respective input channel feature map being convolved with a corresponding filter kernel. As a result, u·v filters may function as v filter banks each having u filters (one filter per input channel). In some embodiments, such a scheme may be supplemented with biasing, channel grouping, a stride, dilation and/or any of various other extensions.

Filters of layer 110 (e.g., including filters 111, 112, 113) may each correspond to a different respective channel of data which is to be communicated from layer 110 to mask layer 120. For example, the resulting input data may be variously received with three or more channels of mask layer 120—e.g., where input data includes data 115 received with a first channel, data 116 received with a second channel, and data 117 received with a third channel. Filters 111, 112, 113 may correspond (respectively) to the first channel, the second channel, and the third channel—e.g., wherein data 115 is a result of convolution of data 105 with filter 111, data 116 is a result of convolution of data 105 with filter 112, and data 117 is a result of convolution of data 105 with filter 113.

Method 200 may further comprise (at 220) communicating an at least partially masked version of the input data from the mask layer to a second layer of the CNN. For each of one or more channels of the plurality of channels, masking of a respective portion of the input data may be based on the value corresponding to the channel. For example, referring again to system 100, output data $out_{c,x,y}$ may be generated at mask layer 120 based on the corresponding $in_{c,x,y}$ and on multiple mask channels each corresponding to a different respective one of the first channel, second channel and third channel. A given data value of $in_{n,c,x,y}$ may be set to zero ("0") or otherwise attenuated by multiplication using a mask value $h_{l,c}^{i,n}$ for the channel corresponding to said data—e.g., according to the following:

$$out_{n,c,x,y} = in_{n,c,x,y} \cdot h_{l,c}^{i,n} \quad (4)$$

At the same time, one or more other channels of mask layer 120 may be differently masked or not masked at all (e.g., where $h_{l,c}^{i,n}$ is equal to one). In the example embodiment of system 100, output data $out_{c,x,y}$ includes data 125 communicated via the first channel, data 126 communicated via the second channel, and data 127 communicated via the third channel. A given iteration of the evaluation process may (for example) mask most or all of the second channel—e.g., wherein the one or more values of data 126 are each set to zero or some otherwise scaled down version of a corresponding value of data 116.

Pruning of the second channel (assuming the evaluation process ultimately indicates such pruning) may include removing structures of layer 110 and/or structures of layer 130 which variously facilitate communication via the second channel. For example, layer 130 may be a convolution layer which is to perform convolution operations based on data 105 and further based on one or more filters (e.g., including the illustrative filters 131, 132 shown). In such an embodiment, pruning of the second channel may including pruning from the final CNN some neurons, connections and/or other circuitry of layer 130 which would support convolution of data 126 with one or both of filters 131, 132. Alternatively or in addition, pruning of the second channel may prune from the final CNN some neurons, connections and/or other circuitry of layer 110 which would support convolution of data 105 with filter 112.

To facilitate a gradient descent evaluation, some embodiments determine a value $w_l$ which varies with, is equal to or otherwise indicates a fraction of channels at a mask layer which are maintained by a current mask configuration of that mask layer. For example, a value of $w_l$ may be determined according to the following:

$$w_l = \frac{1}{n_l} \sum_c p_{l,c} \quad (5)$$

where $n_l$ is a total number of channels at the mask layer in question (e.g., at mask layer 120).

It is noted that a fraction $w_l$ of data channels at a given mask layer l may correspond to (e.g., be equal to) a fraction of input data channels at a layer of CNN 104 (such as layer 130) which is to receive $out_{c,x,y}$ from that mask layer l. Alternatively or in addition, such a fraction $w_l$ of data channels at the mask layer l may correspond to a fraction of output data channels at another layer of CNN 104 (such as layer 110) which is to provide $in_{c,x,y}$ to that mask layer l. The parameter $w_{l,in}$ refers herein to a fraction of input channels at a given layer of a CNN. Similarly, the parameter $w_{l,out}$ refer herein to a fraction of output channels at a given layer of a CNN.

A gradient descent evaluation may be further facilitated by the determining of a value $\xi_l$ which is used to subsequently update the Lagrange multiplier $\lambda_F^i$. In one example embodiment, value $\xi_l$ is determined as a function of $n_l$, and $D_{l,c}{}^i$ and respective gradients $\partial p_{l,c}/\partial \rho_{l,c}$ for each channel c of mask layer l. One example of such a function is the following:

$$\xi_l = \frac{1}{n_l^2} \sum_c \frac{\partial p_{l,c}}{\partial \rho_{l,c}} \cdot \frac{\alpha_\rho}{\sqrt{D_{l,c}^i}} \tag{6}$$

where $\alpha_\rho$ is a learning rate parameter (such as one adapted from any of various RMSprop techniques) used to update parameters $\rho_{l,c}$. The parameters $w_l$ and $\xi_l$ may then be provided to determine $F^i$, $\lambda_F{}^{i+1}$ and/or other parameters used in a gradient descent evaluation. In the example of system 100, parameters $w_l$ and $\xi_l$ are provided via signals 122 which are communicated from mask layer 120 to evaluation logic 140 of device 102.

In an embodiment, method 200 further comprises (at 230) performing a gradient descent evaluation based on each of a loss L of the CNN, and a fraction w of the plurality of channels, wherein the loss L and the fraction w each correspond to the current mask configuration(s) for the iteration. For example, referring again to the embodiment of system 100, a gradient descent evaluation may include the determining of data $L^i$ which represents metric of performance provided with CNN 104, where such loss is due at least in part to channel masking by mask layer 120. The loss function L (e.g., indicated by signal 142) may represent an accuracy of data output by CNN 104, in some embodiments. An averaged loss function $L_0$ of a CNN may be expressed, for example, according to the following:

$$L_0(\theta, \rho) = E_{(X,Y),x}[L_0(\theta, h(p(\rho), x))] \tag{7}$$

where $E_z[\cdot]$ represents a mean (expectation) of some function [·] averaged over some one or more variables z, where (X, Y) represents a ground truth dataset, where θ represents parameters of CNN 104, where p represents retention probabilities each based on a respective parameter ρ, and where x represents random values each for a corresponding one of retention probabilities p.

Some embodiments calculate or otherwise determine an adjusted mean loss as a function which takes into account a particular amount $F^i$ of a processing resource of CNN 104 (the amount corresponding to the channel masking which is performed at iteration i). In this particular context, the "amount" may be represented as a scalar value. Such an adjusted loss function may account for improved resource utilization (if any) that may be allowed by a channel pruning which is under consideration.

Evaluation of F may be according to any of various functions of $w_l$ (and, by extension, a function of parameter ρ)—e.g., where F(ρ) is expressed according to the following:

$$F(\rho) = \sum_{l_{in}, l_{out}} F_{l_{in}, l_{out}} w_{l_{in}} w_{l_{out}} + \sum_l G_l w_l + H \tag{8}$$

In equation (8) above, the notations in and out refer, respectively, the input channels at a given layer of CNN 104, and the output channels at that given layer. The input channels of the given layer are coupled to receive respective input data from some preceding layer, and the output channels of the given layer are coupled to communicate respective output data toward some subsequent layer. Accordingly, $w_{l_{in}}$ represents a fraction of the input channels which (at least during iteration i) are retained in the given layer (at least during iteration i), where $w_{l_{out}}$ similarly represents a fraction of the output channels which are retained in the given layer during iteration i. The parameter $F_{l_{in} \cdot l_{out}}$ represents a numeric coefficient for an expected amount of a processing resource (e.g., FLOPs). The parameter $G_l$ represents a numeric coefficient for FLOPs (if any) to which a bias term may apply. The parameter H represent a collection of any FLOP terms to which no fractional value w applies.

The function $F^i$ may represent a relationship between the expected FLOPs (or other processing resource) performed in some or all CNN layers—e.g., including all convolutional (conv) layers and/or all fully connected (FC) layers. By way of illustration and not limitation, a "theoretical" FLOPs amount FLOPs[1] for a given cony layer (or a FC layer) with no channel masking may be represented by the following:

$$FLOPs^1 = X_{out} Y_{out} K^2 C_{in} C_{out} + [has\_bias]$$
$$X_{out} Y_{out} C_{out} = F^1 G^1 \tag{9}$$

where X and Y are feature map sizes, K is a kernel size (e.g., X=Y=K=1 for FC layers), and C is a number of channels. The binary term [has_bias] in equation (9) may be equal to 1 if the layer has a bias term, otherwise [has_bias] may be equal to 0. If both input and output channels of the network layer are pruned with pruning ratios $w_{in}$ and $w_{out}$ (respectively), the respective adjusted numbers of input channels and output channels may be represented as $w_{in} C_{in}$ and $w_{out} C_{out}$. Accordingly, an adjusted FLOPs[1, pruned] may be expressed as follows (with the same $F^1$ and $G^1$):

$$FLOPs^{1, pruned} = F^1 w_{in} w_{out} + G^1 w_{out} \tag{10}$$

where $F^1$ is equal to the product $(X_{out} Y_{out} K^2 C_{in} C_{out})$, and where $G^1$ is equal to the product $([has\_bias] X_{out} Y_{out} C_{out})$. In an embodiment where multiple mask layers are each coupled between a respective two layers of CNN 104, the respective amounts FLOPs[1, pruned] for such mask layers may be summed to determine $F^i$—e.g., as illustrated by equation (8).

In an embodiment, the performing at 230 comprises determining an adjusted loss value based on a product of the amount F and a Lagrange multiplier $\lambda_F$—e.g., wherein method 200 further comprises updating the Lagrange multiplier $\lambda_F$. For example, to facilitate a constrained optimization, some embodiments calculate the adjusted mean loss function using the Lagrange multiplier $\lambda_F$—e.g., according to the following:

$$L(\theta, \rho) = L_0(\theta, \rho) - \lambda_F F(\rho) = E_{(X,Y),x}[L_0(\theta^i, h(\rho_{l,c}{}^i, x_{l,c}{}^{i,n})) - \lambda_F{}^i F(h(\rho_{l,c}{}^i, x_{l,c}{}^{i,n}))] \tag{11}$$

where X is a list with input data in a training set, where Y is a list with corresponding ground truth data for each sample in X (that is, Y contains the correct "answer" to each sample in X), and where x is an array with random variables used in the one or more mask layers. For example, $(X^i, Y^i)$ may be a minibatch fed to the network at iteration i—e.g., where $X^i$ is a 4-dimensional array with indices n,c,y,x containing floating-point numbers, and where $Y^i$ is a 1-dimensional array with index n containing ground truths for the corresponding samples in $X^i$. Accordingly, $E_{(X,Y),x}$ may be average over the whole training dataset and over random values x. To facilitate gradient descent optimization (such as SGD), various embodiments feed a minibatch $X^i, Y^i$. During training, $X^i$ may be fed as network input, where a resulting network output is subsequently fed into a loss function engine together with $Y^i$. The calculated loss L may be a single value based on operation of the entire convolutional neural network (as selectively masked by one or more mask layers).

In an embodiment, the term $\lambda_F F$ (or more particularly, $\lambda_F^i F^i$) may act as a marginal change in loss $L_0(\theta^{opt})$ as some reference amount of resources $F_{schedule}$ increases. Due to the difficulty of calculating some theoretical value of multiplier $\lambda_F$ from an optimal condition where an actual amount $F$ corresponds to $F_{schedule}$ (e.g., a reference amount of FLOPs), some embodiments implement a scheme wherein a current multiplier $\lambda_F^i$ is updated iteratively. Generally, the value of multiplier $\lambda_F$ may be decreased where $F$ is greater than $F_{schedule}$ (and, similarly, increased where $F$ is less than $F_{schedule}$). In one or more iterations, multiplier $\lambda_F$ may be negative.

To facilitate processing of an iteration's backward pass, evaluation logic 140 may send to mask layer 120 (and in some embodiments, to one or more other mask layers of system 100) information which is determined based on the forward pass portion of that iteration. Such information may include the current adjusted mean loss $L^i$ and/or any of a variety of other parameters which are based on loss function $L^i$, multiplier $\lambda_F^i$, or amount $F^i$. For each of the one or more mask layers which receive such information, the mask layer may evaluate a contribution (if any) of masking by that mask layer to the loss $L^i$, to amount $F^i$ or the like. In another embodiment, some or all such evaluation may take place at evaluation logic 140.

In an example embodiment, respective derivatives $\partial L_0 / \partial x_{l,c}^{i,n}$ of the loss $L_0$ may be evaluated for a given mask layer—e.g., wherein a derivative is determined analytically and values for $x_{l,c}^{i,n}$ are then variously substituted into the resulting expression. Some or all derivative values $\partial L_0 / \partial x_{l,c}^{i,n}$ may be variously evaluated each using a respective backpropagation algorithm which, for example, is implemented in a deep learning framework of device 102. Such an algorithm may provide an analytical differentiation of an expression for a layer's outputs as a function of that layer's inputs and other parameters.

In the backward pass of an iteration, a given mask layer may perform respective derivative evaluations $\partial L_0 / \partial x_{l,c}^{i,n}$ based on respective input data $in_{l,c}^{i,n}$ and derivatives with respect to corresponding output data $out_{l,c}^{i,n}$—e.g., according to the following:

$$\frac{\partial L_0}{\partial x_{l,c}^{i,n}} = \frac{\partial L_0}{\partial out_{l,c}^{i,n}} \cdot \frac{\partial out_{l,c}^{i,n}}{\partial x_{l,c}^{i,n}} = \frac{\partial L_0}{\partial out_{l,c}^{i,n}} \cdot in_{l,c}^{i,n} \cdot \frac{\partial h(\rho_{l,c}^i, x_{l,c}^{i,n})}{\partial x_{l,c}^{i,n}} \tag{12}$$

where $$\frac{\partial L_0}{\partial out_{l,c}^{i,n}} \cdot in_{l,c}^{i,n} \cdot \frac{\partial h(\rho_{l,c}^i, x_{l,c}^{i,n})}{\partial x_{l,c}^{i,n}} = \frac{\partial L_0}{\partial out_{l,c}^{i,n}} \cdot in_{l,c}^{i,n} \cdot \frac{[x_0(\rho) < x_{l,c}^{i,n} < x_1(\rho)]}{x_1(\rho) - x_0(\rho)} \tag{13}$$

Some embodiments include a deep learning framework which is configured to automatically provide such differentiation.

The determining of mask values h with a Lipschitz-continuous and differentiable mask function—such as function s of equation (3)—may enable the determining of such gradients, thereby enabling learnable (i.e., adaptively reconfigurable) mask layers. For example, for a given mask layer, evaluations of the various derivatives $\partial L_0 / \partial x_{l,c}^{i,n}$ may then be used to perform an iterative update which determines—for any next (i+1)th iteration—a replacement $D_{l,c}^{i+1}$ for the current variance parameter $D_{l,c}^i$. Updating $D_{l,c}^i$ may facilitate dynamic adaptation by the mask layer during gradient descent optimization.

The determining of a given $D_{l,c}^{i+1}$ may be based on a summation value $L'_{0p}$ which serves as an approximation for a partial derivative $\partial L / \partial p_{l,c}$. In one example embodiment, value $L'_{0p}$, is be determined according to the following:

$$L'_{0p} = -\sum_n \frac{\partial L_0}{\partial x_{l,c}^{i,n}} \tag{14}$$

where index n represents a given sample of a minibatch. In such an embodiment, variance parameter $D_{l,c}^{i+1}$ may be expressed as:

$$D_{l,c}^{i+1} = (1-\delta) \cdot D_{l,c}^i + \delta \cdot (L'_{0p})^2 \tag{15}$$

where $\delta$ is a predefined weighting parameter which, for example, is equal to $1/200$. However, the particular value of $\delta$ may be vary in other embodiments according to implementation-specific details.

To further enable dynamic adaptation during stochastic gradient descent-based optimization, some embodiments additionally or alternatively calculate another summation value $L'_p$ which is used to determine—for any next (i+1)th iteration—updated replacements $p_{l,c}^{i+1}$ for current parameters $\rho_{l,c}^i$. Parameters $\rho_{l,c}$ may be updated based on an estimated derivative with respect to $p_{l,c}$ (as opposed to $\rho_{l,c}$) to avoid vanishing gradients problem of a sigmoid function.

The summation value $L'_p$ may represent an adjusted summation which takes into account the current multiplier $\lambda_F$ and amount $F$—e.g., where summation value $L'_p$ is determined according to the following:

$$L'_p = -\sum_n \left( \frac{\partial L_0}{\partial x_{l,c}^{i,n}} - \lambda_F \frac{\partial F}{\partial p_{l,c}^i} \right) \tag{16}$$

In an example embodiment, the various updated parameters $\rho_{l,c}^{i+1}$ may be expressed as:

$$\rho_{l,c}^{i+1} = \text{clip}\left( \rho_{l,c}^i - \alpha_\rho \cdot \text{clip}\left( \frac{L'_p}{\sqrt{D_{l,c}^{i+1}}}, -3, +3 \right), -\rho_{lim}, +\rho_{lim} \right) \tag{17}$$

where clip (x, a, b) is a function which clips some value x to an interval [a, b], where $\alpha_\rho$ is a learning rate parameter (such as that of a RMSprop solver), and where $\rho_{lim}$ is a predefined maximum allowed absolute value for parameters $\rho_{l,c}^i$. By way of illustration and not limitation, one example embodiment may include $\delta$ equal to $1/200$, $\alpha_\rho$ equal to 0.03, and $\rho_{lim}$ equal to 12—e.g., wherein parameter values $\rho_{l,c}^{i=0}$ are set to $+\rho_{lim}$ to retain nearly all channels at least during an initial iteration i=0.

Referring again to FIG. 2, method 200 may further comprise (at 240) determining updated parameters of the CNN based on the gradient descent evaluation. For example, a gradient descent optimization process performed with device 102 may further comprise determining some or all of: updated parameters $\theta^{+1}$ of CNN 104, an updated Lagrange multiplier $\lambda_F^{i+1}$, and an updated reference amount $F_{schedule}^{i+1}$. By way of illustration and not limitation, parameters $\theta$ may be iteratively optimized—e.g., using a stochastic gradient descent (SGD) optimization such as:

$$\theta^{i+1} = \theta^i - \alpha \nabla_\theta L(\theta^i, X^i, Y^i) \tag{18}$$

where α is a predefined learning rate parameter, and where $\nabla_\theta L$ a differential of loss L over parameters θ.

Alternatively or in addition, an updated Lagrange multiplier $\lambda_F^{i+1}$ may be determined based on a partial derivative $\partial F(\rho^{i+1})/\partial \lambda_F^i$ which, for example, is expressed as:

$$\frac{\partial F(\rho^{i+1})}{\partial \lambda_F^i} \approx \sum_{l,c} \left(\frac{\partial F}{\partial p_{l,c}}\right)^2 \frac{\partial p_{l,c}}{\partial \rho_{l,c}} \cdot \frac{\alpha_\rho}{\sqrt{D_{l,c}^i}} \quad (19)$$

or alternatively, expressed as:

$$\frac{\partial F(\rho^{i+1})}{\partial \lambda_F^i} \approx \sum_l \left(\frac{\partial F}{\partial w_l}\right)^2 \cdot \xi_l \quad (20)$$

In such an embodiment, multiplier $\lambda_F^{i+1}$ may be evaluated as:

$$\lambda_F^{i+1} = \lambda_F^i - \delta_{\lambda_F} \lambda_F^i - \beta \frac{F(\rho^i) - F_{schedule}^i}{\partial F(\rho^{i+1})/\partial \lambda_F^i} \quad (21)$$

where $$\frac{\partial F(\rho^{i+1})}{\partial \lambda_F^i} \approx \sum_{l,c} \left(\frac{\partial F}{\partial p_{l,c}}\right)^2 \frac{\partial p_{l,c}}{\partial \rho_{l,c}} \cdot \frac{\alpha_\rho}{\sqrt{D_{l,c}^i}} \quad (22)$$

where β is an under-relaxation factor, and where $\delta_{\lambda_F}$ is a damping parameter. In one example embodiment, β is equal to 0.5 or 1.0, and $\delta_{\lambda_F}$ is equal to 0.2. In another example, β is equal to 0.05, and $\delta_{\lambda_F}$ is equal to 1.0.

Such feedback modification to multiplier $\lambda_F$ may facilitate dampening of instabilities which would otherwise take place over multiple iterations. For example, a first few hundred iterations of multiplier $\lambda_F$ could otherwise attain very high transient values due to feedback from $F^i$ lagging behind $\lambda_F^i$. In some embodiments, multiplier $\lambda_F$ may demonstrate quasiperiodic oscillations (e.g., at about 8 iteration periodicity). To address this, evaluation of multiplier $\lambda_F$ may be averaged over a few hundred iterations, for example.

Alternatively or in addition, the reference parameter $F_{schedule}^i$ may be iteratively adjusted (e.g., lowered) during fine-tuning. Decreasing $F_{schedule}^i$ slowly may enable additional iterations for fine-tuning which mitigates at least some loss caused by previously indicated channel pruning. However, decreasing $F_{schedule}^i$ may also increase the time needed to identify a final pruning of CNN 104. Early iterations may drive $F_{schedule}^i$ down faster than at the later iterations, with relatively small loss in network performance. In some embodiments, $F_{schedule}$ is updated iteratively according to an exponential decay function, such as:

$$F_{schedule}^{i+1} = F_{schedule}^i + \frac{1}{\text{relax\_iter}} \cdot (F_{limit} - F_{schedule}^i) \quad (23)$$

where relax_iter is a user-defined relaxation parameter, and where $F_{limit}$ is a reference amount of the processing resource. An initial value of $F_{limit}$ (at iteration i=0) may be set relatively low—e.g., where $F_{limit}$ is equal to 0, is less than or equal to 0.25 $F_{full}$, or the like. In response to detection of network loss during early iterations, the value for $F_{limit}$ may be reset—e.g., to mitigate a rate at which $F_{schedule}$ drops. With a relatively low value of relax_iter, fine-tuning may fall behind the network pruning process, resulting in an higher loss of network quality. By way of illustration and not limitation, setting relax_iter equal to 30·10³ may result in relatively quick pruning at the cost of network quality. By contrast, relatively slower pruning and higher quality network operation may be provided with relax_iter being on the order of 150·10³, 300·10³ or the like.

In other embodiments, iterative updates to $F_{schedule}$ may be based on a heuristic feedback function—e.g., according to the following:

$$F_{schedule}^{i+1} = F_{schedule}^i + \quad (24)$$
$$\text{clip}\left(\frac{1}{\text{relax\_iter}} \cdot (F_{limit} - F_{schedule}^i), -\text{max\_rate}, +\text{max\_rate}\right)$$

where $$\text{max\_rate} = \begin{cases} \frac{\text{max\_loss\_rate}}{|\lambda_F| + 10^{-6}} & \text{for } \lambda_F^i \cdot \frac{F_{limit} - F_{schedule}^i}{\text{relax\_iter}} > 0, \\ +\infty & \text{otherwise.} \end{cases} \quad (25)$$

and where max_loss_rate represents a user-defined maximum per-iteration loss deterioration rate.

Respective values of relax_iter and $F_{limit}$ may be set to avoid oscillations of multiplier $\lambda_F$ for at least some initial fine-tuning. For example, relax_iter may be initially set equal to 30·10³, and $F_{limit}$ equal to zero. In some embodiments, the value of max_loss_rate is set based on the identification of an iteration i where network quality starts to drop. Based on such identification, max_loss_rate may be set, for example, according to the following:

$$\text{max\_loss\_rate} = (0.25 \ldots 0.5) \cdot \langle \lambda_F^i \rangle \cdot \frac{F_{limit} - F_{schedule}^i}{\text{relax\_iter}} \quad (26)$$

where, to mitigate statistical noise, $\langle \lambda_F^i \rangle$ is an average of $\lambda_F^i$ over neighboring iterations.

Referring again to FIG. 2, method 200 may further comprises (at 250) signaling, based on the updated parameters, that a channel is to be pruned from the CNN. For example, after the determination of a loss $L^i$ (and/or other performance metric information) for a given iteration i, a determination may be made as to whether any next iteration of the evaluation process is to take place. In one embodiment, evaluation logic 140 detects whether a metric of output data quality is indicative of some one or more test criteria having been met. Such detecting may include comparing a threshold quality value with a quality of data which is output by the CNN—e.g., where a metric of data quality (e.g., indicating accuracy, precision and/or the like) is determined for some number of most recent iterations of the evaluation process. In some embodiments, such a quality metric is evaluated as a function (e.g., a summation, an average, a mean or the like) of multiple metric terms which are variously determined each for a different respective iteration. Basing the test criteria on a quality metric which is determined for multiple iterations may compensate for the possibility of short-term, temporary drops in the quality of network output during a relatively small number of iterations. Based on such detecting, current values of CNN parameters $\rho_{l,c}{}^i$ may be provided to indicate—e.g., by keeping channels with positive values of $\rho_{l,c}{}^i$—those resources of an original CNN design, as updated according to parameters $\theta^i$, which are to be pruned.

In some embodiments, multiple mask layers are configured to be variously coupled each between a respective two layers of a CNN—e.g., wherein a given iteration of an evaluation process includes each such mask layer selectively masking a respective plurality of channels based on a corresponding mask configuration. In such an embodiment, method 200 may further comprise determining a second fraction of a second plurality of channels of a second mask layer coupled between a respective two layers of the CNN. The second fraction may correspond to another mask configuration of the second mask layer, wherein performing the gradient descent evaluation at 230 includes determining, based on the fraction w and the second fraction, an amount F of a processing resource of the CNN.

Figure 3:
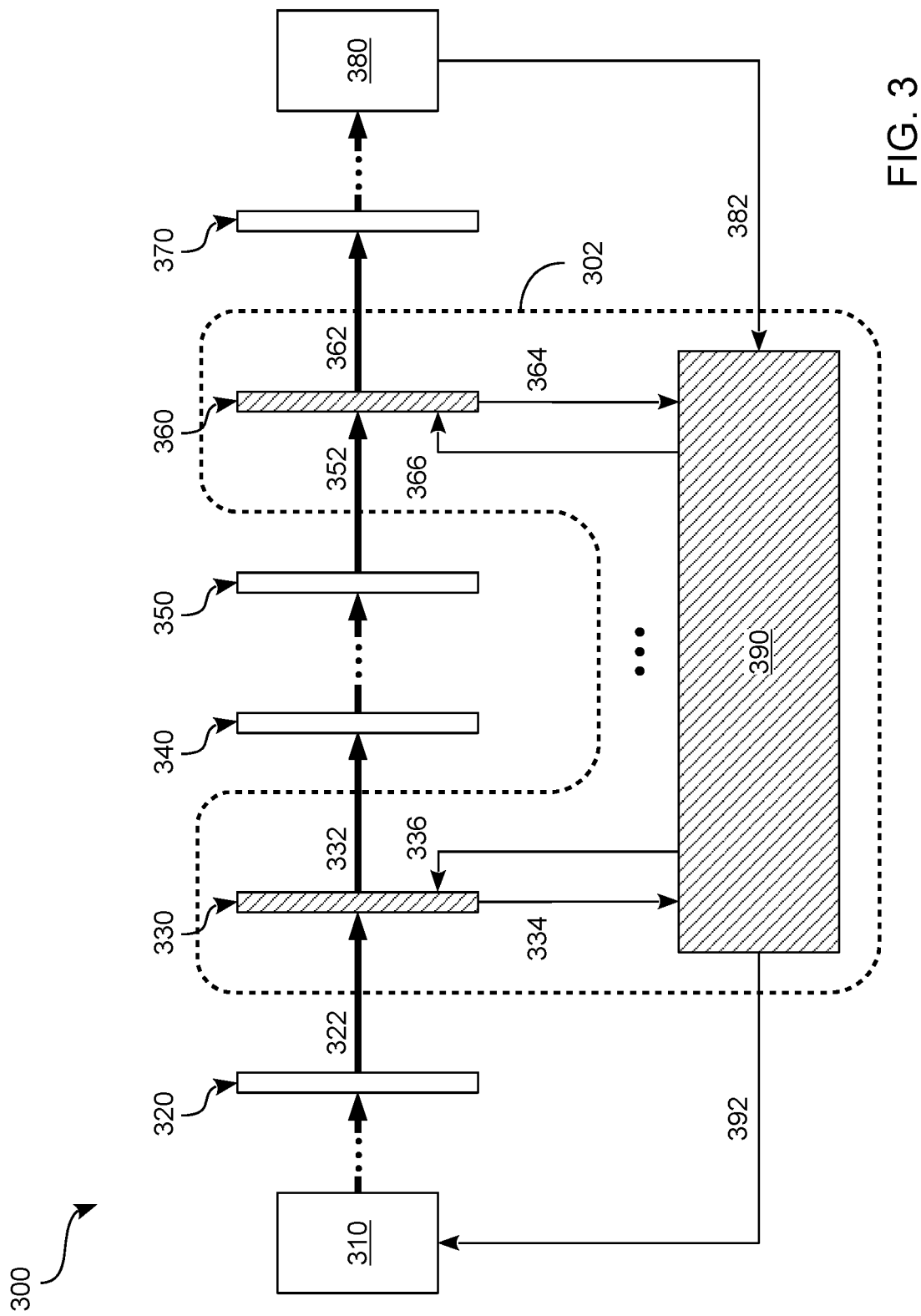
FIG. 3 is a functional block diagram illustrating elements of system to prune channels of a convolutional neural network according to an embodiment.

For example, FIG. 3 shows a system 300 to prune a CNN according to an embodiment. System 300 may include features of system 100—e.g., wherein operation of system 300 includes some or all of method 200. As shown in FIG. 3, a device 302 of system 300 includes multiple mask layers (e.g., including the illustrative mask layers 330, 360) and evaluation logic 390 coupled thereto. Device 302 may provide some or all of the functionality of device 102. In the example embodiment shown, the CNN may include layers 320, 340, 350, 370, a data source 310 comprising circuitry to provide data (e.g., including training data and/or test data) for the CNN, and a data sink 380 comprising circuitry to receive an output generated with layers 320, 340, 350, 370. Mask layer 330 may be coupled to receive first data 322 from layer 320 via a first plurality of channels, and to send an at least partially masked version 332 of such first data 322 to layer 340. Alternatively or in addition, mask layer 360 may be coupled to receive second data 352 from layer 350 via a second plurality of channels, and to send an at least partially masked version 362 of such second data 352 to layer 370. Data sink 380 may perform or otherwise facilitate processing of an output from preceding layers—e.g., to evaluate a level of performance (e.g., including a metric of loss) which is provided by the CNN based on channel masking by mask layers of device 302.

During a given iteration of an evaluation process with device 302, signals 382 from data sink 380 may specify or otherwise indicate to evaluation logic 390 an amount of CNN loss which is associated with channel masking during the iteration. In such an embodiment, mask layer 330 may calculate parameters corresponding to the masking of the first plurality of channels—e.g., where signals 334 communicate some or all such parameters to evaluation logic 390. Similarly, signals 364 may communicate, from mask layer 360 to evaluation logic 390, parameters corresponding to the masking of the second plurality of channels.

Evaluation logic 390 may perform operations (such as those described herein with reference to evaluation logic 140) to determine—based on signals 334, 364, 382—a resource amount F, a loss L and/or other parameters described herein. Some or all such parameters may be variously communicated to the mask layers of device 302—e.g., using signals 336 to mask layer 330 and/or signals 366 to mask layer 360. Based on respective signals 336, 366, the mask layers 330, 360 may variously evaluate how their various channel masking may have contributed to resource amount F, a loss L. Alternatively or in addition, information provided with signals 336, 366 may determine changes to the respective mask configurations of mask layers 330, 360. In some embodiments, evaluation logic 390 may determine whether a next iteration of the evaluation process is to take place—e.g., where data source 310 is to provide data for such a next iteration responsive to a signal 392 from evaluation logic 390.

In some embodiments, an evaluation process—such as that provided with device 302—comprises multiple iterations of channel masking and gradient descent evaluation. One or more such iterations may each include features of method 200, for example. Multiple iterations of such an evaluation process may be performed with a plurality of mask layers each coupled between a respective two layers of a CNN. For each iteration of the multiple iterations, said iteration may comprise each mask layer of a plurality of mask layers receiving, with a plurality of channels of that mask layer, respective input data from a preceding layer of the CNN. Each such mask layer may communicate, based on a current mask configuration thereof, an at least partially masked version of the respective input data. The current mask configuration of a given mask layer may be based on a plurality of values $p_{l,c}$ which each indicate a respective probability that a corresponding channel of the mask layer is to be maintained. Each iteration of the multiple iterations may further comprise performing a gradient descent evaluation based on a respective loss of the CNN, and further based on a respective amount of a processing resource (e.g., a number of FLOPs), wherein the respective loss and the respective amount of the processing resource correspond to a combination of the respective current mask configurations of the plurality of mask layers.

Figure 4:
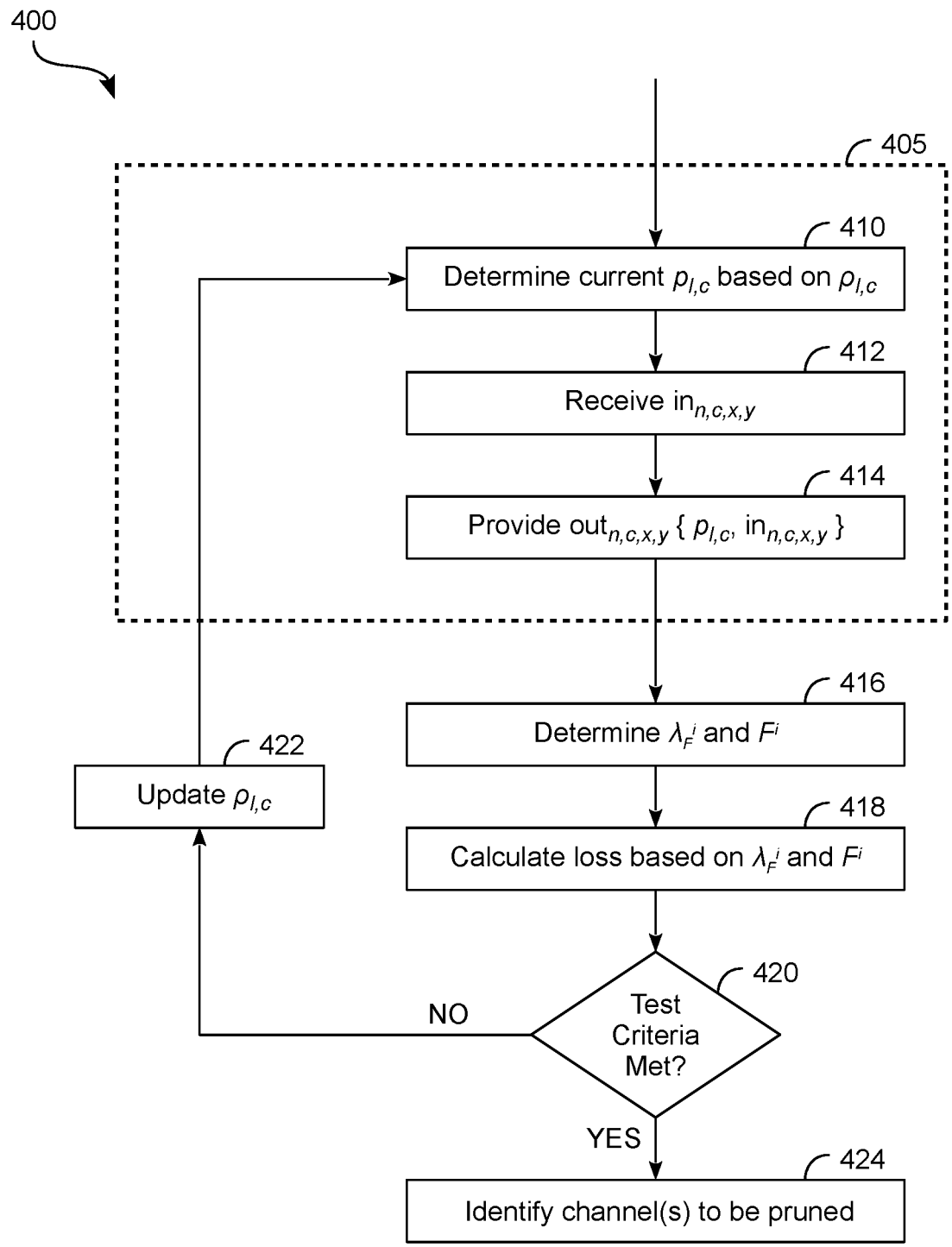
FIG. 4 is a flow diagram illustrating elements of a method to iteratively determine pruning of a convolutional neural network according to an embodiment.

For example, referring now to FIG. 4, a method 400 according to an embodiment may be performed—e.g., with device 302—to determine channel pruning of a CNN. In an embodiment, method 400 comprises operations 403 which plurality of mask layers are each to variously perform during an iteration i of the evaluation process. For example, operations 405 may comprise (at 410) a given mask layer l determining, for each channel c of that mask layer l, a respective current probability value $p_{l,c}$ of channel retention (the probability value $p_{l,c}$ based on a parameter $\rho_{l,c}$). The determining at 410 may include, for example, calculations such as those indicted by equation (1) or equation (2) herein. Operations 405 may further include (at 412) the mask layer receiving respective input data $in_{n,c,x,y}$ from a preceding layer of the CNN—e.g., including the receiving at 210 of method 200. The mask layer may (at 414) provide output data $out_{n,c,x,y}$ which is generated as a function of probability values $p_{l,c}$ and $in_{n,c,x,y}$ where the output data $out_{n,c,x,y}$ is a partially masked version of $in_{n,c,x,y}$. In an embodiment, masking to generate output data $out_{n,c,x,y}$ is according to equation (4) herein.

Based on the mask layers each variously performing operations 405, information may be provided for a gradient descent evaluation—e.g., by evaluation logic 390. For example, method 400 may further comprise (at 416) determining a Lagrange multiplier $\lambda_F{}^i$ and a resource amount $F^i$ for iteration i—e.g., where resource amount $F^i$ is determined according to equation (8) herein. Based on multiplier $\lambda_F{}^i$ and resource amount $F^i$, method 400 may calculate (at 418) an adjusted loss of the CNN which corresponds to the various channel masking by the masking layers. Such calculating at 418 may be according to equation (11) herein, for example.

In an embodiment, a determination may be made (at 420) as to whether the resource amount $F^i$ and/or the adjusted loss indicate, at least in part, that some test criteria has been met. The determining at 420 may include (for example) comparing a level of network performance with some predefined threshold level of network performance. Alternatively or in addition, the determining at 420 may include checking whether some predefined number of iterations has been performed.

Where the one or more test criteria have not been met, method 400 may (at 422) update parameters $\rho_{l,c}$ which are used to determine probability values $p_{l,c}$ for a next iteration of the evaluation process. By contrast, detecting that the one or more test criteria have been met may result in method 400 identifying (at 424) one or more channels which are to be pruned from the CNN. For example, the identifying at 424 may include, for each mask layer l, identify each channel c of that layer l for which a corresponding mask value $h_{l,c}$ was during a most recent iteration—equal to zero or less than some threshold value (e.g., less than 0.5).

Figure 5:
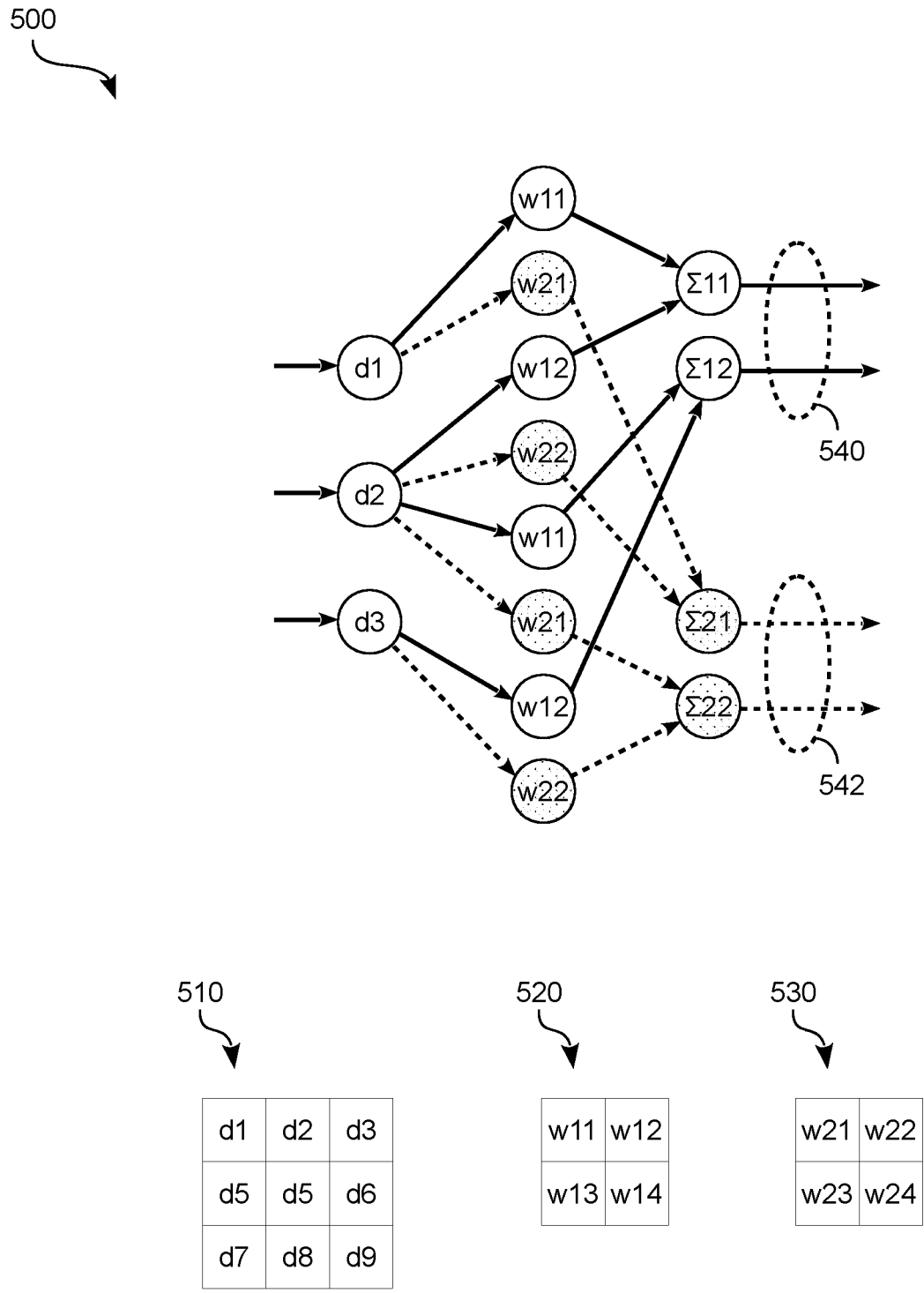
FIG. 5 is a network diagram illustrating resources to be pruned from a layer of a convolutional neural network according to an embodiment.

FIG. 5 shows features of a neural network layer 500 to be pruned according to an embodiment. Such pruning may be part of, or otherwise based on, one of methods 200, 400 e.g., wherein layer 500 includes features of one of layers 110, 130, 320, 340, 350, 370. As shown in FIG. 5, layer 500 is a convolution layer of a CNN, where neurons (or "nodes") of layer 500 are configured to perform both a first convolution of data 510 with a filter 520 and a second convolution of data 510 with another filter 530. Such convolution may be adapted from conventional CNN techniques, for example.

In an example scenario according to one embodiment, the first convolution of data 510 with filter 520 may generate data to be communicated via a channel 540, where—but for a pruning of the CNN—the second convolution of data 510 with a filter 530 would generate other data to be communicated via a different channel 542. Filters 520, 530 correspond to channels 540, 542, respectively. For example, data 510 may include values d1-d9, where filter 520 includes values w11, w12, w13, w14, and where filter 530 includes values w21, w22, w23, w24. In such an embodiment, a product [d1·w11] and a product [d2·w12] may be two terms of a sum value $\Sigma 11$ which is to be communicated via channel 540—e.g., where products [d2·w11] and [d3·w12] are two terms of another sum value $\Sigma 12$ which is to be communicated via channel 540. Similarly, products [d1·w21] and [d2·w22] may be two terms of a sum value $\Sigma 21$ which is to be communicated via channel 542—e.g., where products [d2·w21] and [d3·w22] are two terms of another sum value $\Sigma 22$ which is to be communicated via channel 542

An evaluation processing according to an embodiment may determine that one or more channels of layer 500—e.g., including channel 542—are to be pruned from the CNN. Based on such an evaluation process, a redesigned version of layer 500 may omit various synapses, weights, nodes and/or other components which would otherwise generate and communicate sum values $\Sigma 21$, $\Sigma 22$ (and any other values associated with channel 542). To illustrate such a redesign, FIG. 5 shows various shaded circles and dashed lines representing, respectively, nodes and synapses to be pruned from layer 500.

Figure 6:
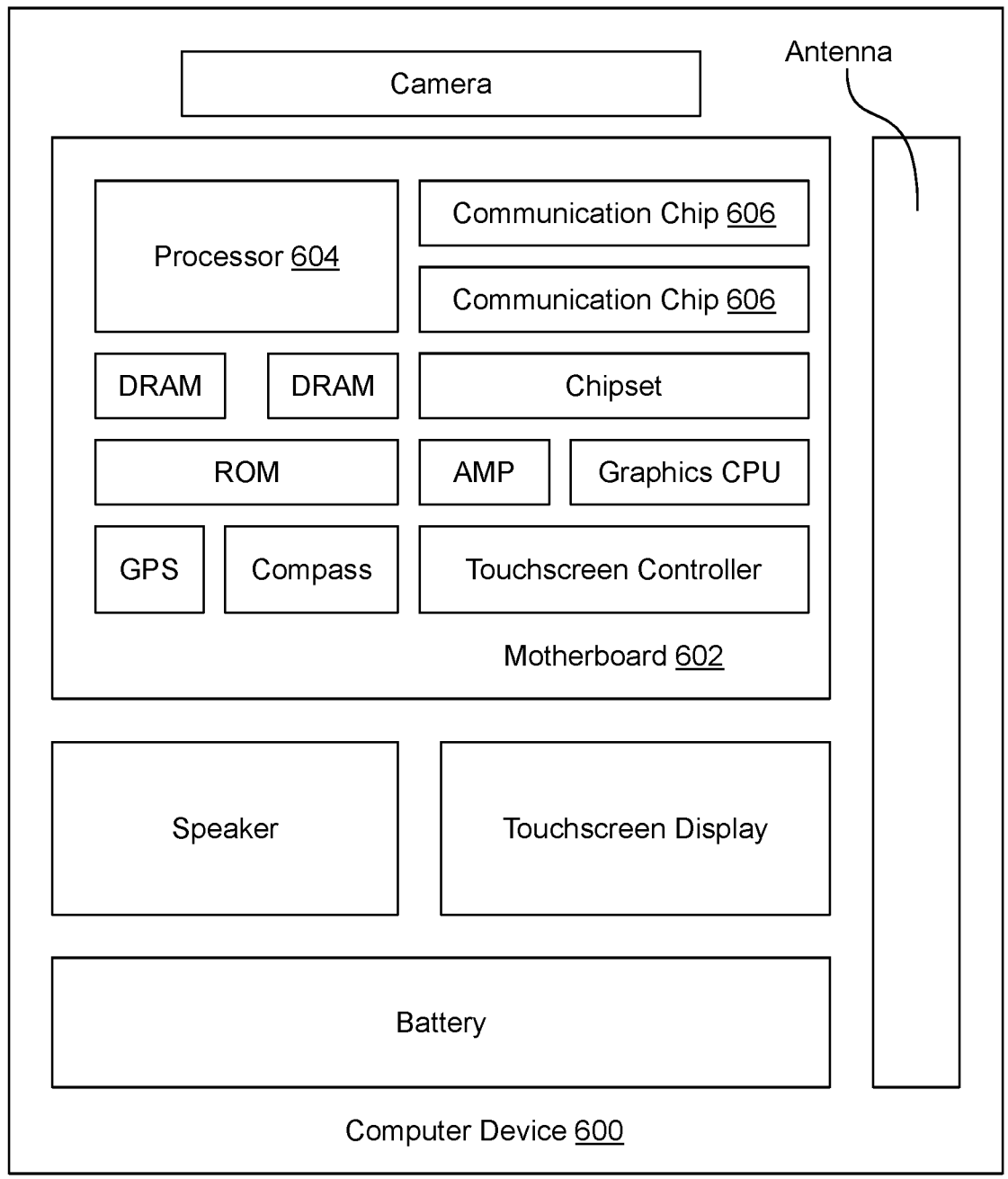
FIG. 6 is a functional block diagram illustrating a computing device in accordance with one embodiment.

FIG. 6 illustrates a computing device 600 in accordance with one embodiment. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. The term "processor" may refer to any device or portion of a device that processes electronic data from registers and/or memory to transform that electronic data into other electronic data that may be stored in registers and/or memory. The communication chip 606 also includes an integrated circuit die packaged within the communication chip 606.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 7:
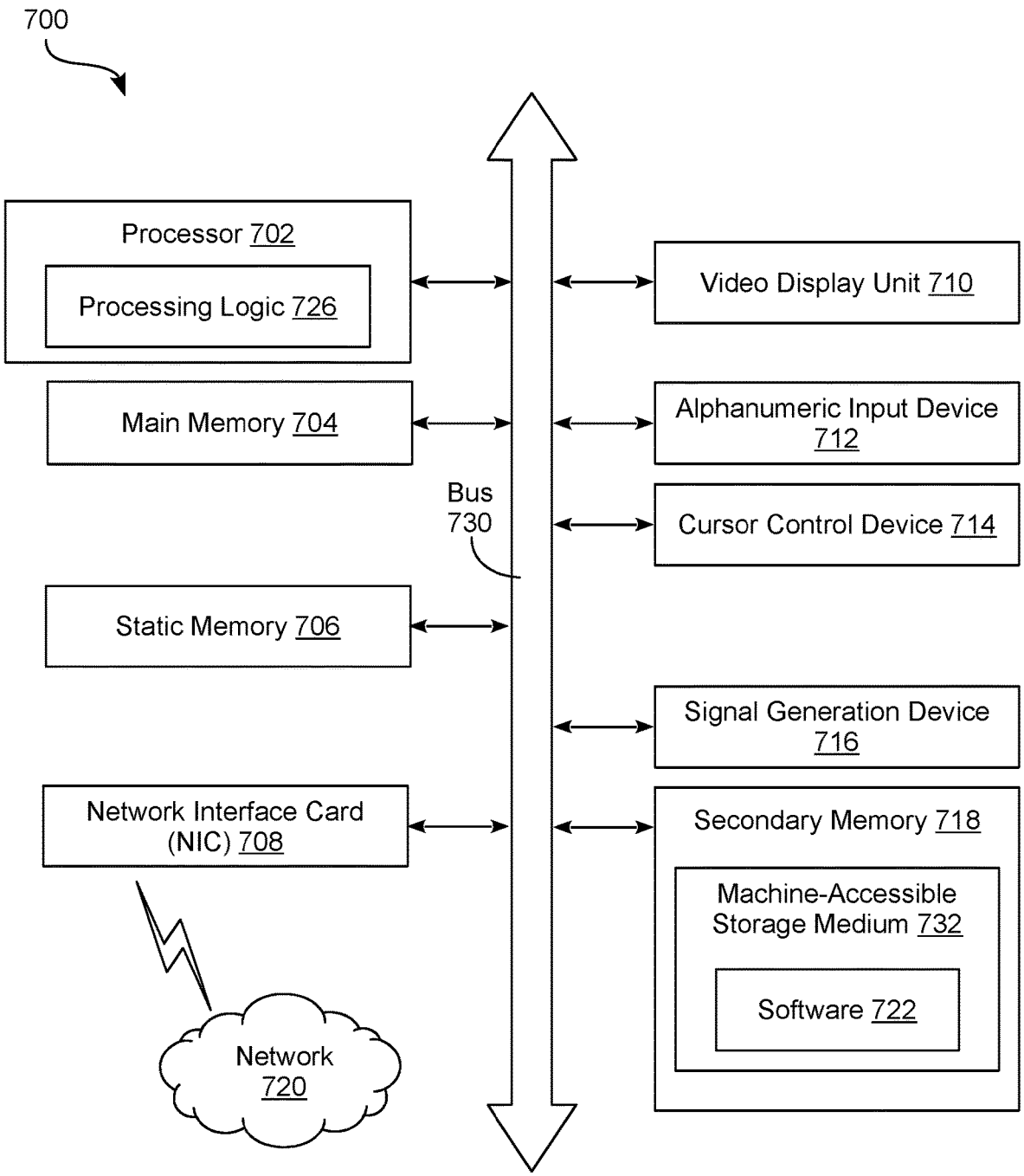
FIG. 7 is a functional block diagram illustrating an exemplary computer system, in accordance with one embodiment.

FIG. 7 illustrates a diagrammatic representation of a machine in the exemplary form of a computer system 700 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations described herein.

The computer system 700 may further include a network interface device 708. The computer system 700 also may include a video display unit 710 (e.g., a liquid crystal display (LCD), a light emitting diode display (LED), or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 732 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

While the machine-accessible storage medium 732 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for configuring a convolutional neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for evaluating a convolutional neural network (CNN), the computer device comprising circuitry to:
   receive, with a plurality of channels of a mask layer, input data from a first layer of the CNN, wherein a configuration of the mask layer is based on a plurality of values which each correspond to a different respective channel of the plurality of channels, wherein the plurality of values each indicate a respective probability that the corresponding channel is to be maintained;
   communicate an at least partially masked version of the input data from the mask layer to a second layer of the CNN, wherein, for each of one or more channels of the plurality of channels, masking of a respective portion of the input data is based on the value corresponding to the channel;
   perform a gradient descent evaluation based on each of a loss L of the CNN, and a fraction w of the plurality of channels, wherein the loss L and the fraction w each correspond to the mask configuration;
   determine updated parameters of the CNN based on the gradient descent evaluation;
   based on the updated parameters, signal that a channel is to be pruned from the CNN; and
   determine a second fraction of a second plurality of channels of a second mask layer coupled between a respective two layers of the CNN, the second fraction corresponding to another mask configuration of the second mask layer;
   wherein circuitry to perform the gradient descent evaluation based on the fraction w includes circuitry to determine, based on the fraction w and the second fraction, an amount F of a processing resource of the CNN.

2. The computer device of claim 1, further comprising circuitry to perform multiple iterations with a plurality of mask layers each coupled between a respective two layers of the CNN, wherein the multiple iterations each comprise:
   for each mask layer of a plurality of mask layers, the mask layer to:
      receive, with a plurality of channels of the mask layer, respective input data from the CNN; and
      based on a current mask configuration of the mask layer, communicate an at least partially masked version of the respective input data from the mask layer to the CNN, wherein the current mask configuration is based on a plurality of values which each indicate a respective probability that a corresponding channel of the mask layer is to be maintained; and
   evaluation logic to perform a gradient descent evaluation based on each of a respective loss of the CNN and a respective amount of the processing resource, wherein the respective loss and the respective amount of the processing resource correspond to a combination of the respective current mask configurations of the plurality of mask layers.

3. The computer device of claim 1, wherein circuitry to perform the gradient descent evaluation comprises circuitry to determine an adjusted loss value based on a product of the amount F and a Lagrange multiplier $\lambda_F$, the computer device further comprising circuitry to update the Lagrange multiplier $\lambda_F$ based on the updated parameters of the CNN.

4. The computer device of claim 1, wherein the first layer and the second layer are each a respective one of a convolutional layer or a fully connected layer.

5. The computer device of claim 1, further comprising circuitry to perform a comparison with the amount F and a reference amount of the processing resource, wherein the circuitry to signal that the channel is to be pruned is responsive to the comparison.

6. The computer device of claim 5, further comprising circuitry to update the reference amount of the processing resource according to an exponential decay function.

7. The computer device of claim 5, wherein circuitry to perform the gradient descent evaluation comprises circuitry to determine an adjusted loss value based on a product of the amount F and a Lagrange multiplier $\lambda_F$, the computer device further comprising circuitry to update the reference amount of the processing resource according to heuristic function based on the Lagrange multiplier $\lambda_F$.

8. The computer device of claim 5, wherein circuitry to perform the gradient descent evaluation comprises circuitry to determine an adjusted loss value based on a product of the amount F and a Lagrange multiplier $\lambda_F$, the computer device further comprising circuitry to update the Lagrange multiplier $\lambda_F$ based on the reference amount of the processing resource.

9. At least one non-transitory computer-readable storage medium having stored thereon instructions which, when executed by one or more processing units, cause the one or more processing units to perform a method for evaluating a convolutional neural network (CNN), the method comprising:
   receiving, with a plurality of channels of a mask layer, input data from a first layer of the CNN, wherein a configuration of the mask layer is based on a plurality of values which each correspond to a different respective channel of the plurality of channels, the plurality of values each indicating a respective probability that the corresponding channel is to be maintained;
   communicating an at least partially masked version of the input data from the mask layer to a second layer of the CNN, wherein, for each of one or more channels of the plurality of channels, masking of a respective portion of the input data is based on the value corresponding to the channel;

performing a gradient descent evaluation based on each of a loss L of the CNN, and a fraction w of the plurality of channels, wherein the loss L and the fraction w each correspond to the mask configuration;

determining updated parameters of the CNN based on the gradient descent evaluation;

based on the updated parameters, signaling that a channel is to be pruned from the CNN; and determining a second fraction of a second plurality of channels of a second mask layer coupled between a respective two layers of the CNN, the second fraction corresponding to another mask configuration of the second mask layer;

wherein performing the gradient descent evaluation based on the fraction w includes determining, based on the fraction w and the second fraction, an amount F of a processing resource of the CNN.

10. The at least one computer-readable storage medium of claim 9, the method further comprising performing multiple iterations with a plurality of mask layers each coupled between a respective two layers of the CNN, the multiple iterations each comprising:

for each mask layer of a plurality of mask layers:
receiving, with a plurality of channels of the mask layer, respective input data from the CNN; and
based on a current mask configuration of the mask layer, communicating an at least partially masked version of the respective input data from the mask layer to the CNN, wherein the current mask configuration is based on a plurality of values each indicating a respective probability that a corresponding channel of the mask layer is to be maintained; and
performing a gradient descent evaluation based on each of a respective loss of the CNN and a respective amount of the processing resource, wherein the respective loss and the respective amount of the processing resource correspond to a combination of the respective current mask configurations of the plurality of mask layers.

11. The at least one computer-readable storage medium of claim 9, wherein performing the gradient descent evaluation comprises determining an adjusted loss value based on a product of the amount F and a Lagrange multiplier $\lambda_F$, the method further comprising updating the Lagrange multiplier $\lambda_F$ based on the updated parameters of the CNN.

12. The at least one computer-readable storage medium of claim 9, wherein the first layer and the second layer are each a respective one of a convolutional layer or a fully connected layer.

13. The at least one computer-readable storage medium of claim 9, the method further comprising:
performing a comparison with the amount F and a reference amount of the processing resource, wherein the signaling is further based on the comparison.

14. The at least one computer-readable storage medium of claim 13, the method further comprising updating the reference amount of the processing resource according to an exponential decay function.

15. The at least one computer-readable storage medium of claim 13, wherein performing the gradient descent evaluation comprises determining an adjusted loss value based on a product of the amount F and a Lagrange multiplier $\lambda_F$, the method further comprising:

updating the reference amount of the processing resource according to heuristic function based on the Lagrange multiplier $\lambda_F$.

16. The at least one computer-readable storage medium of claim 13, wherein performing the gradient descent evaluation comprises determining an adjusted loss value based on a product of the amount F and a Lagrange multiplier $\lambda_F$, the method further comprising:
updating the Lagrange multiplier $\lambda_F$ based on the reference amount of the processing resource.

17. A method for evaluating a convolutional neural network (CNN), the method comprising:
receiving, with a plurality of channels of a mask layer, input data from a first layer of the CNN, wherein a configuration of the mask layer is based on a plurality of values which each correspond to a different respective channel of the plurality of channels, the plurality of values each indicating a respective probability that the corresponding channel is to be maintained;
communicating an at least partially masked version of the input data from the mask layer to a second layer of the CNN, wherein, for each of one or more channels of the plurality of channels, masking of a respective portion of the input data is based on the value corresponding to the channel;
performing a gradient descent evaluation based on each of a loss L of the CNN, and a fraction w of the plurality of channels, wherein the loss L and the fraction w each correspond to the mask configuration;
determining updated parameters of the CNN based on the gradient descent evaluation;
based on the updated parameters, signaling that a channel is to be pruned from the CNN; and
determining a second fraction of a second plurality of channels of a second mask layer coupled between a respective two layers of the CNN, the second fraction corresponding to another mask configuration of the second mask layer;
wherein performing the gradient descent evaluation based on the fraction w includes determining, based on the fraction w and the second fraction, an amount F of a processing resource of the CNN.

18. The method of claim 17, further comprising performing multiple iterations with a plurality of mask layers each coupled between a respective two layers of the CNN, the multiple iterations each comprising:
for each mask layer of a plurality of mask layers:
receiving, with a plurality of channels of the mask layer, respective input data from the CNN; and
based on a current mask configuration of the mask layer, communicating an at least partially masked version of the respective input data from the mask layer to the CNN, wherein the current mask configuration is based on a plurality of values each indicating a respective probability that a corresponding channel of the mask layer is to be maintained; and
performing a gradient descent evaluation based on each of a respective loss of the CNN and a respective amount of the processing resource, wherein the respective loss and the respective amount of the processing resource correspond to a combination of the respective current mask configurations of the plurality of mask layers.

* * * * *